United States Patent
Compton

(10) Patent No.: US 11,930,037 B2
(45) Date of Patent: Mar. 12, 2024

(54) VALIDATION AND IMPLEMENTATION OF FLOW SPECIFICATION (FLOWSPEC) RULES

(71) Applicant: Charter Communications Operating, LLC, St. Louis, MO (US)

(72) Inventor: Richard A. Compton, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 183 days.

(21) Appl. No.: 17/066,065

(22) Filed: Oct. 8, 2020

(65) Prior Publication Data

US 2022/0116417 A1   Apr. 14, 2022

(51) Int. Cl.
*H04L 9/40* (2022.01)

(52) U.S. Cl.
CPC ...... H04L 63/1458 (2013.01); H04L 63/1416 (2013.01)

(58) Field of Classification Search
CPC ............. H04L 63/0263; H04L 63/1416; H04L 63/1458
See application file for complete search history.

(56) References Cited

U.S. PATENT DOCUMENTS

| | | | |
|---|---|---|---|
| 7,792,963 B2 | 9/2010 | Gould et al. | |
| 2003/0056217 A1 | 3/2003 | Brooks | |
| 2005/0135428 A1* | 6/2005 | Hellgren | H04L 63/10 370/481 |
| 2006/0130107 A1 | 6/2006 | Gonder et al. | |
| 2007/0217436 A1 | 9/2007 | Markley et al. | |
| 2009/0248794 A1 | 10/2009 | Helms et al. | |
| 2010/0313236 A1 | 12/2010 | Straub | |
| 2015/0207818 A1* | 7/2015 | Gagliano | H04L 63/029 726/1 |
| 2017/0324738 A1* | 11/2017 | Hari | H04L 63/10 |
| 2018/0176139 A1* | 6/2018 | Mortensen | H04L 63/1416 |
| 2018/0375685 A1* | 12/2018 | Zhuang | H04L 12/4641 |

(Continued)

OTHER PUBLICATIONS

Unwanted traffic removal service. Team Cymru. (Jan. 20, 2022). Retrieved Jun. 19, 2020, from https://team-cymru.com/community-services/utrs/.

(Continued)

*Primary Examiner* — Daniel B Potratz
*Assistant Examiner* — Matthias Habtegeorgis
(74) *Attorney, Agent, or Firm* — Otterstedt & Kammer PLLC

(57) ABSTRACT

A valid route origin authorization (ROA) for a specified IP address is published and a distributed denial-of-service (DDoS) attack to a given IP address is detected. A flowspec rule is advertised from a given autonomous system network to one or more neighboring autonomous system networks in response to the detection of the distributed denial-of-service (DDoS) attack. A modified Resource Public Key Infrastructure (RPKI) validation is performed using the published valid route origin authorization (ROA) in response to the advertisement of the flowspec rule. The flowspec rule is implemented to mitigate the distributed denial-of-service (DDoS) attack in response to the validation of the flowspec rule.

20 Claims, 11 Drawing Sheets

(56) References Cited

U.S. PATENT DOCUMENTS

| | | | |
|---|---|---|---|
| 2019/0140960 A1* | 5/2019 | Liang | H04L 45/04 |
| 2021/0105250 A1* | 4/2021 | Grinius | H04L 61/5061 |
| 2021/0160067 A1* | 5/2021 | Liu | H04L 9/3239 |
| 2021/0203688 A1* | 7/2021 | Ghule | H04L 63/1425 |
| 2021/0258251 A1* | 8/2021 | Eastlake, III | H04L 45/74 |
| 2021/0258256 A1* | 8/2021 | Wang | H04L 45/02 |
| 2023/0059348 A1* | 2/2023 | McBride | H04L 9/3297 |

OTHER PUBLICATIONS

Anonymous, Team Cymru—Helping make the world a better place through insight that saves and improves, downloaded from https://team-cymru.com on Jun. 19, 2020.

IETF (Internet Engineering Task Force) Specification RFC 5575, Dissemination of Flow Specification Rules, by P. Marques et al., Aug. 2009, pp. 1-22.

IETF (Internet Engineering Task Force) Specification RFC 8360, Dissemination of Flow Specification Rules, by G. Huston et al., Apr. 2018, pp. 1-29.

IETF (Internet Engineering Task Force) Specification RFC 4760, Multiprotocol Extensions for BGP-4, by T. Bates et al., Jan. 2007, pp. 1-12.

IETF (Internet Engineering Task Force) Specification RFC 4271, a Border Gateway Protocol 4 (BGP-4), by Y. Rekhter et al., Jan. 2006, pp. 1-104.

* cited by examiner

US 11,930,037 B2

VALIDATION AND IMPLEMENTATION OF FLOW SPECIFICATION (FLOWSPEC) RULES

FIELD OF THE INVENTION

The present invention relates generally to the electrical, electronic and computer arts, and, more particularly, to the prevention, detection and mitigation of network attacks and anomalies.

BACKGROUND OF THE INVENTION

The Border Gateway Protocol (BGP) provides a communication protocol for autonomous systems (AS) communicating on the Internet, within private networks, and the like. BGP provides for the exchange of routing and reachability information. Under BGP, a network-based device advertises reachability of IP prefixes to various network devices, such as network routers. The information provided may be used, for example, to configure route filters and the like to appropriately route network traffic for the autonomous systems. BGP has been extended from being used to advertise IPv4 prefixes to allowing the exchange of different types of information and address families, such as IPv6 unicast/multicast, IPv4 multicast, labeled unicast, and the like.

"Flowspec" is an extension to BGP which allows firewall rules to be distributed via BGP advertisements. Normally, these rules are used to block malicious traffic, such as network traffic associated with a distributed denial of service (DDoS) attack. Flowspec rules are conventionally implemented within and/or at the edge of an Autonomous System under attack; flowspec rules are not, however, conventionally implemented outside of the Autonomous System (AS) issuing the flowspec rule because other Autonomous Systems cannot trust the validity of the flowspec rule received from outside their AS.

SUMMARY OF THE INVENTION

Principles of the invention provide techniques for validation and implementation of flow specification ("Flowspec") rules. In one aspect, an exemplary method includes operations of publishing a valid route origin authorization (ROA) for a specified IP address; detecting a distributed denial-of-service (DDoS) attack to a given IP address; advertising a flowspec rule from a given autonomous system network to one or more neighboring autonomous system networks in response to the detection of the distributed denial-of-service (DDoS) attack; performing a modified Resource Public Key Infrastructure (RPKI) validation using the published valid route origin authorization (ROA) in response to the advertisement of the flowspec rule; and implementing the flowspec rule to mitigate the distributed denial-of-service (DDoS) attack in response to the validation of the flowspec rule.

In one aspect, a non-transitory computer readable medium includes computer executable instructions which when executed by a computer cause the computer to perform the method of: performing a modified Resource Public Key Infrastructure (RPKI) validation using a published valid route origin authorization (ROA) in response to the advertisement of the flowspec rule; and implementing the flowspec rule to mitigate the distributed denial-of-service (DDoS) attack in response to the validation of the flowspec rule.

In one aspect, a networked computing system includes first and second networks. The first network includes a first network-based device implemented using a first memory and at least one first processor, coupled to the first memory, and operative to perform operations including: publishing a valid route origin authorization (ROA) for a specified IP address; detecting a distributed denial-of-service (DDoS) attack to a given IP address; and advertising a flowspec rule from a given autonomous system network to one or more neighboring autonomous system networks in response to the detection of the distributed denial-of-service (DDoS) attack. The second network includes a second network-based device implemented using a second memory and at least one second processor, coupled to the second memory, and operative to perform operations including: performing a modified Resource Public Key Infrastructure (RPKI) validation using the published valid route origin authorization (ROA) in response to the advertisement of the flowspec rule; and implementing the flowspec rule to mitigate the distributed denial-of-service (DDoS) attack in response to the validation of the flowspec rule.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (e.g., a central controller, an intrusion detection system (IDS), an Internet Service Provider (ISP) peering router, a router, a data center router, a distributed denial-of-service (DDoS) detection and/or mitigation device, and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a tangible computer-readable recordable storage medium (or multiple such media) and implemented on a hardware processor, or (iii) a combination of (i) and (ii); any of (i)-(iii) implement the specific techniques set forth herein.

Aspects of the present invention can provide substantial beneficial technical effects. For example, one or more embodiments of the invention achieve one or more of:

prevention and mitigation of network attacks, such as DDoS attacks;

improved network security for preventing and mitigating network attacks;

ubiquitous advertisement and implementation of flowspec rules for mitigating network attacks; and implementation of novel network attack and non-malicious configuration error prevention and mitigation techniques that can be easily integrated with existing system hardware, thereby providing a more robust prevention and mitigation mechanism without significantly increasing system overhead and complexity.

These and other features and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Figure 1:
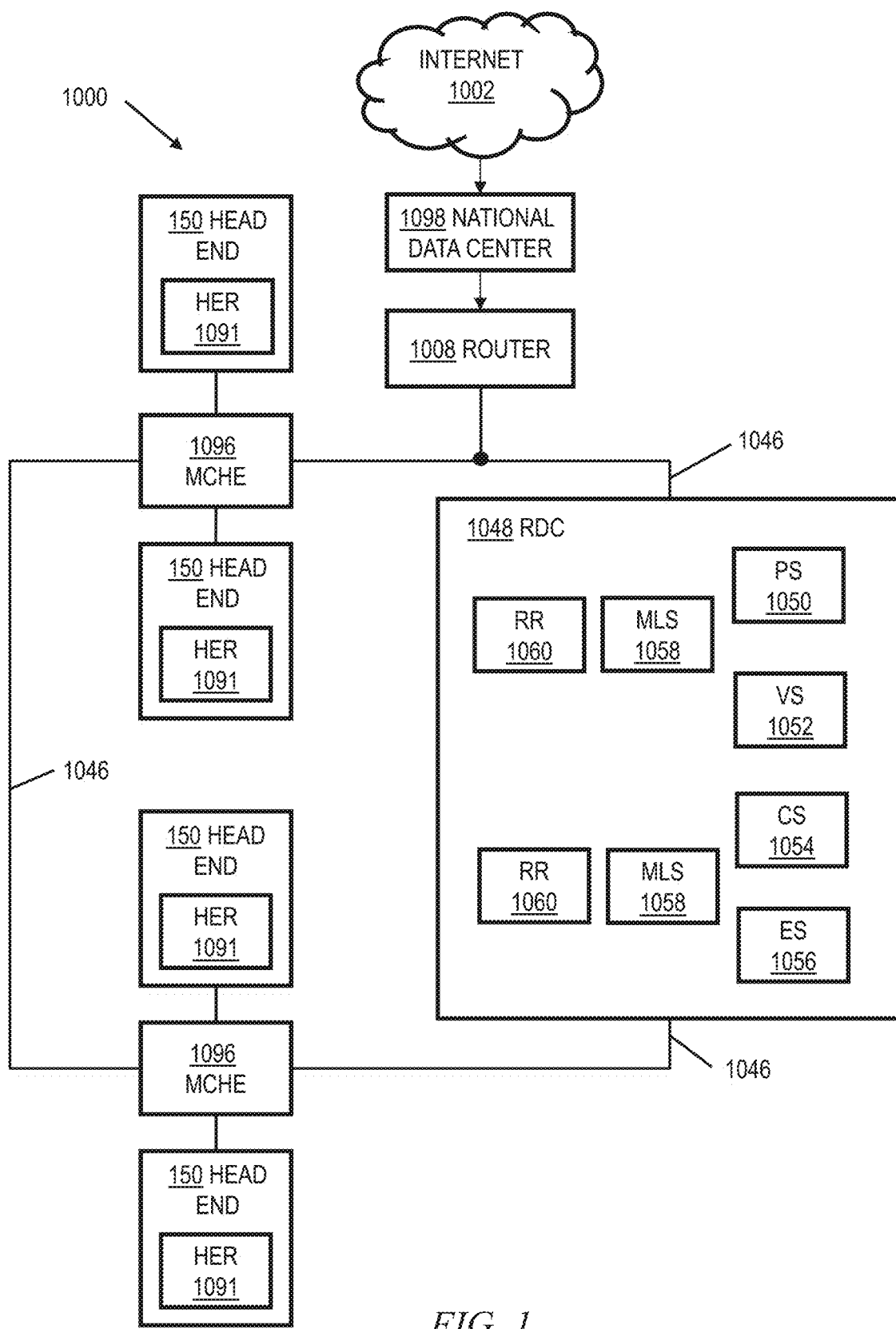
FIG. 1 is a block diagram of an exemplary embodiment of a system, within which one or more aspects of the invention can be implemented.

Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for large metropolitan area(s). In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP)(transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
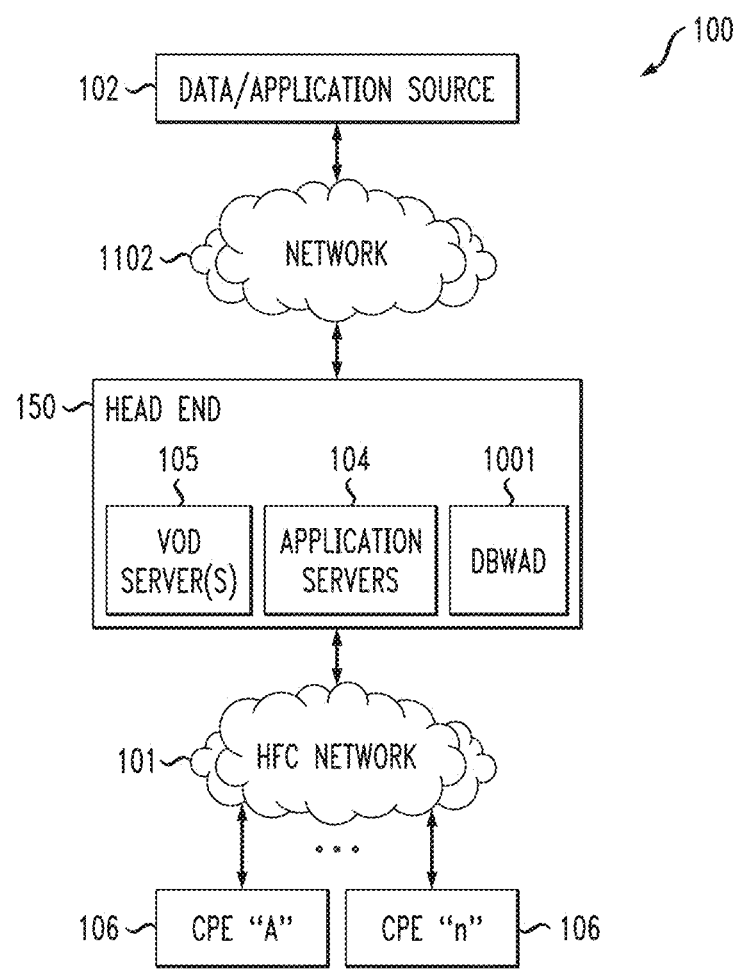
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ Service ONUs (S-ONUs; ONU=optical network unit) as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
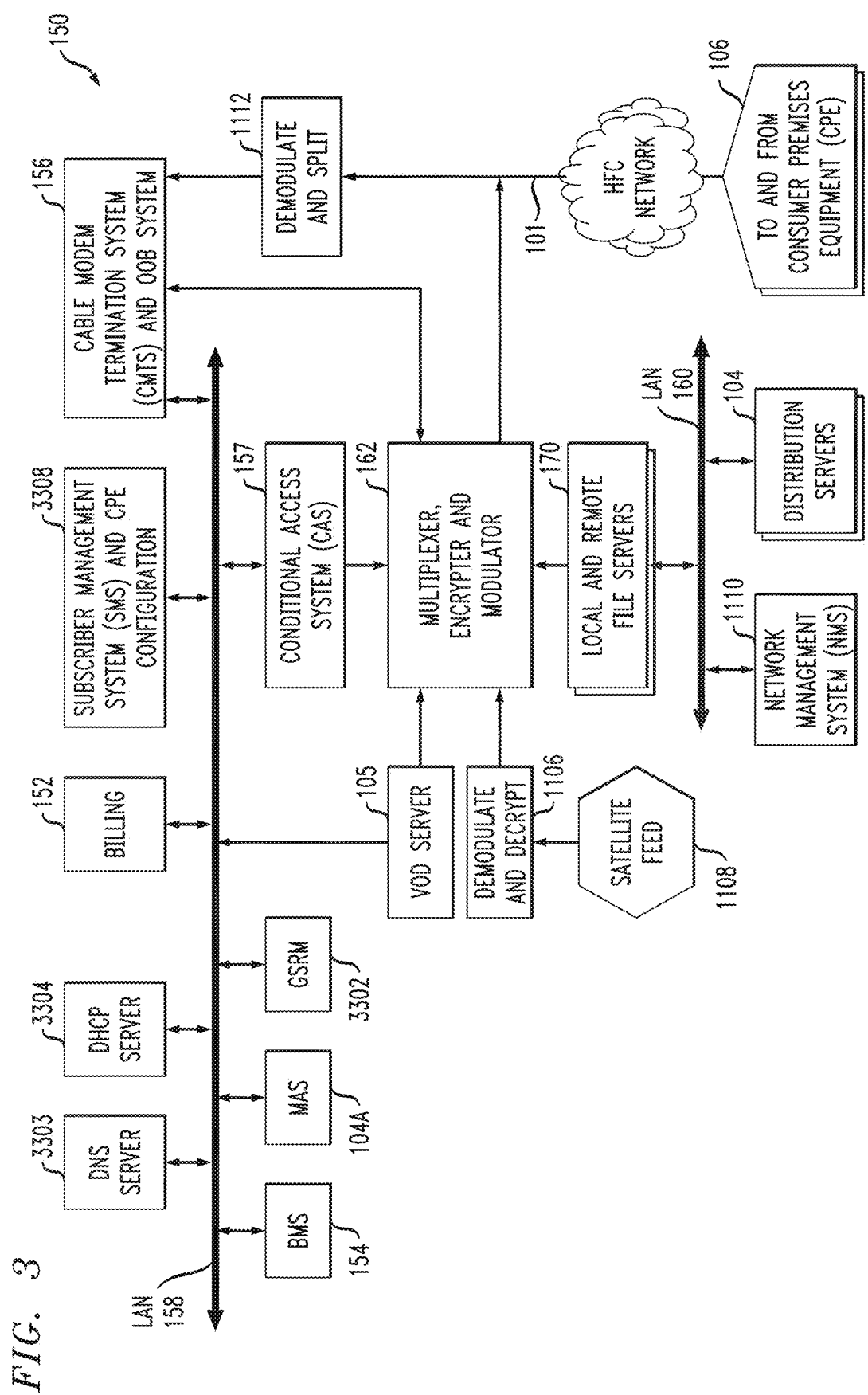
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHORIZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (OOB) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0. or 3.0). The OpenCable™ Application Platform (OCAP) 1.0, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. HFC systems using DOCSIS to transmit data are one non-limiting exemplary application context for one or more embodiments. However, one or more embodiments are applicable to a variety of different kinds of networks.

It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
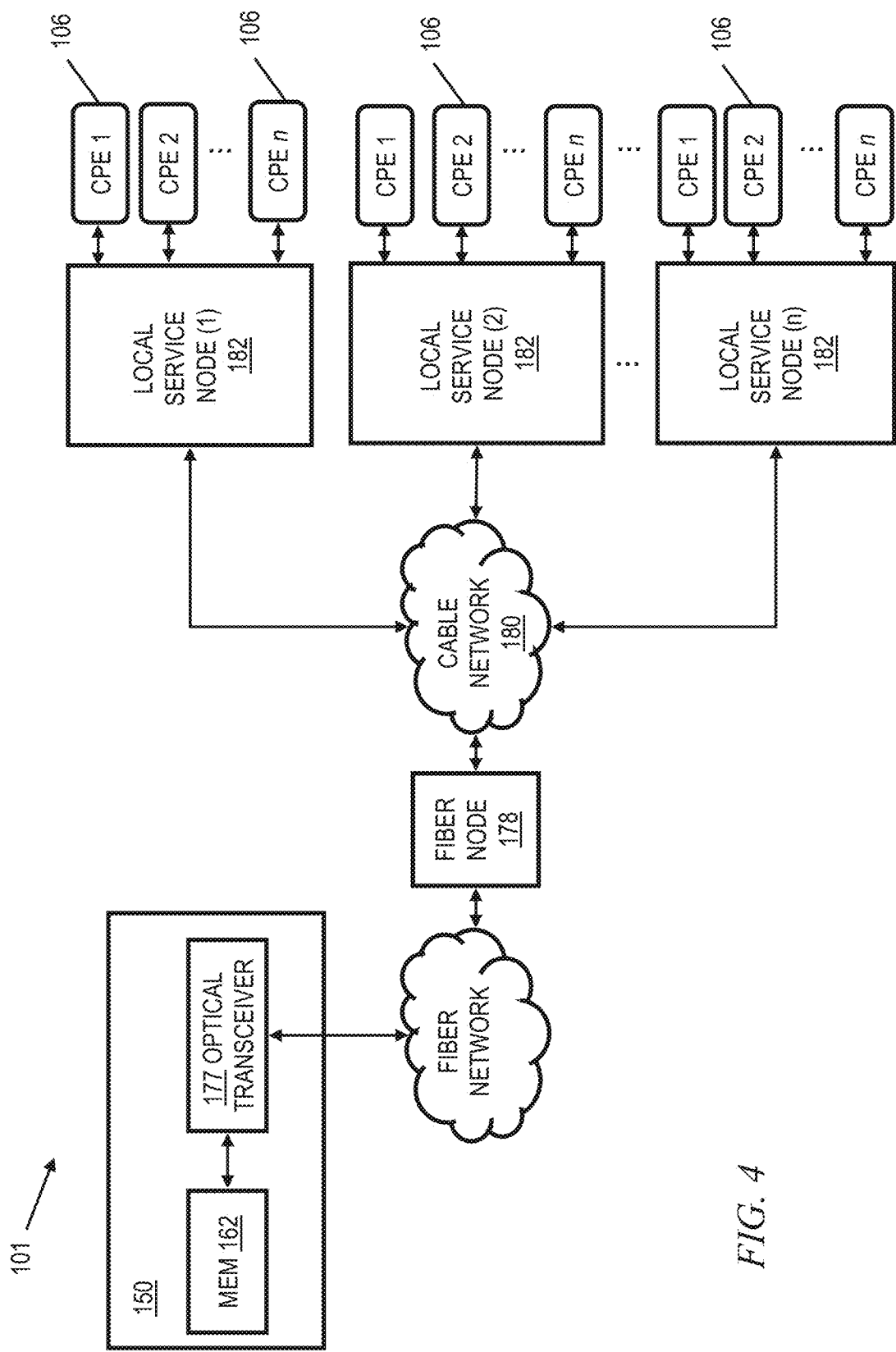
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network 179 to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOC SIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed. It should be understood that embodiments of the invention have broad applicability to a variety of different types of networks. Some embodiments relate to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
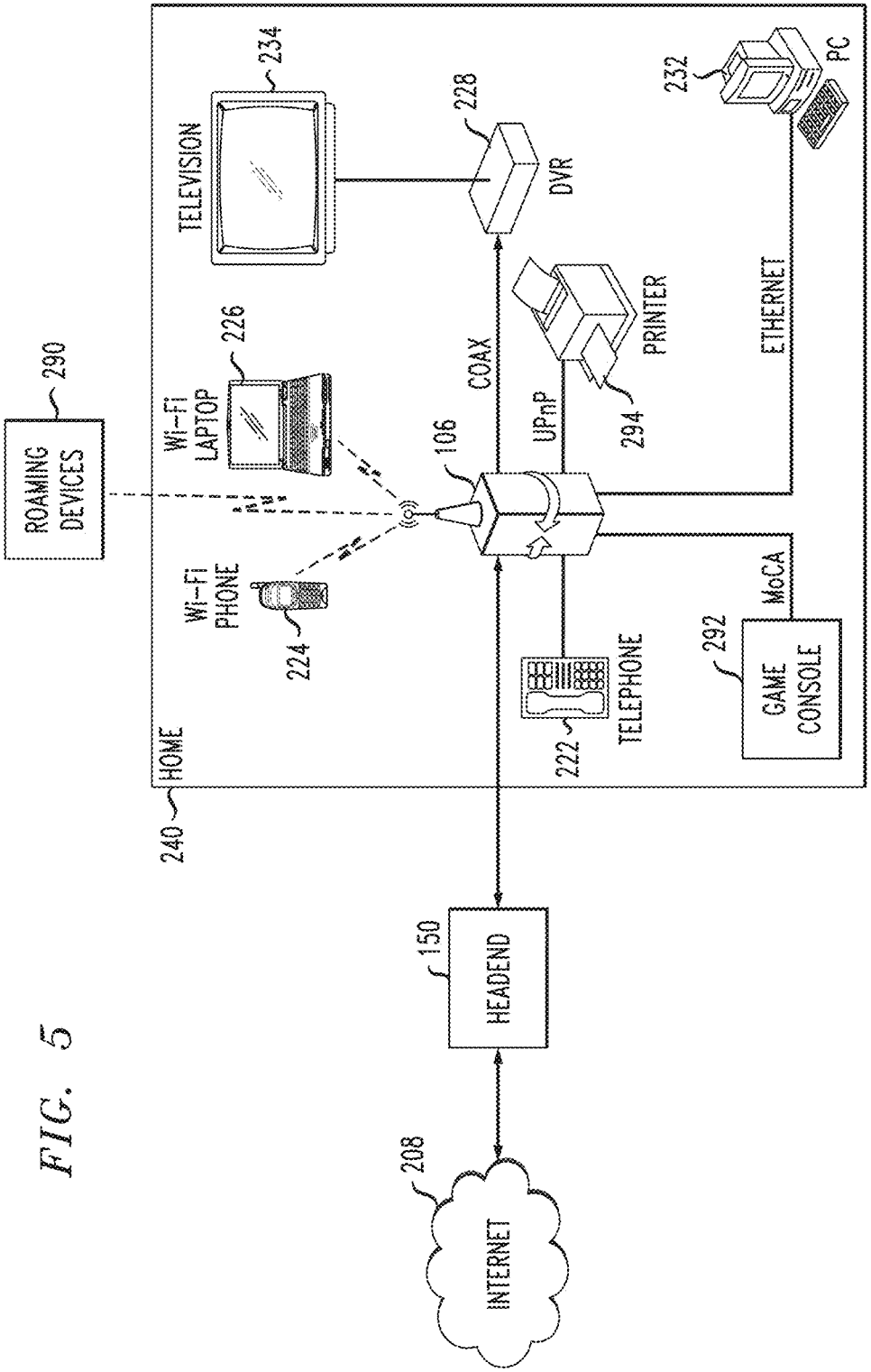
FIG. 5 is a functional block diagram of a premises network, including an exemplary centralized customer premises equipment (CPE) unit, interfacing with a head end such as that of FIG. 3.
Figure 6:
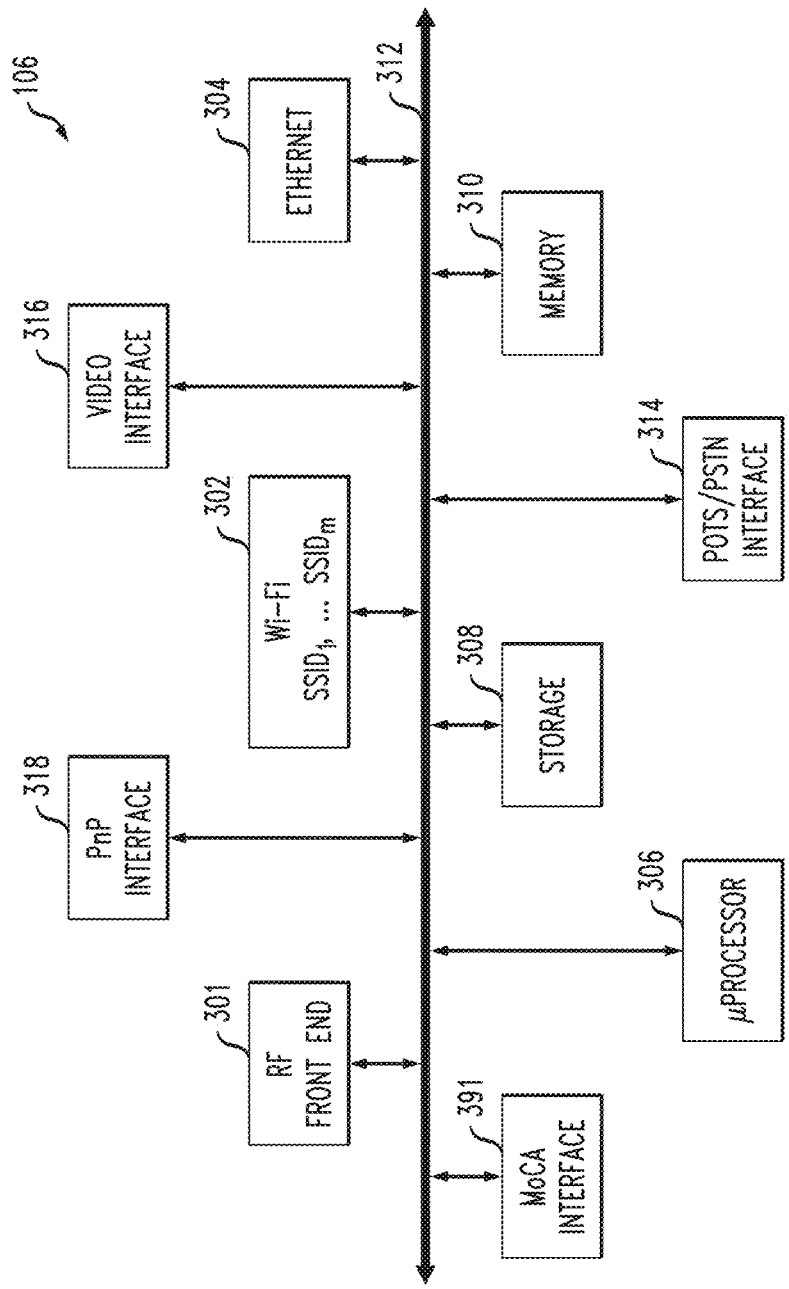
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example, over a universal plug and play (UPnP) interface, and/or a game console 292; for example, over a multimedia over coax alliance (MoCA) interface.

In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances, the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098. The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
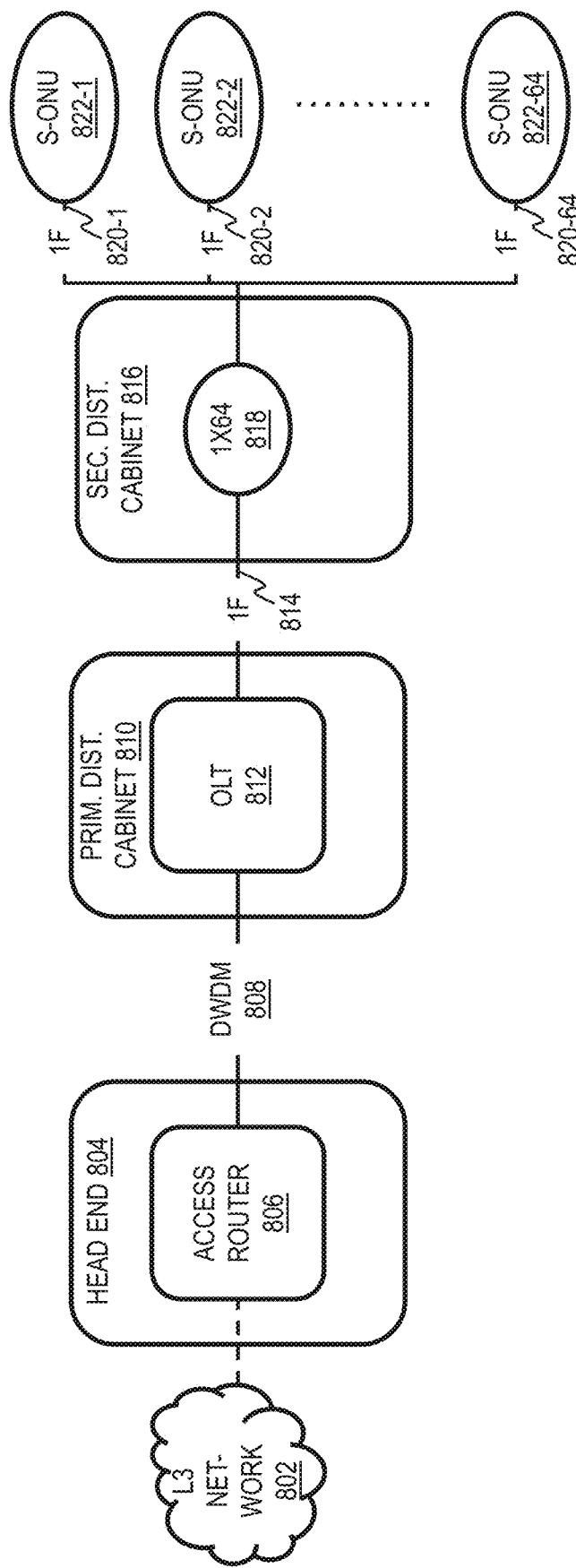
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 1802 generally represents the elements in FIG. 1 upstream of the head ends 150, while head end 1804, including access router 1806, is an alternative form of head end that can be used in lieu of or in addition to head ends 150 in one or more embodiments. Head end 1804 is suitable for FTTH implementations. Access router 1806 of head end 1804 is coupled to optical line terminal 1812 in primary distribution cabinet 1810 via dense wavelength division multiplexing (DWDM) network 1808. Single fiber coupling 1814 is then provided to a 1:64 splitter 1818 in secondary distribution cabinet 1816 which provides a 64:1 expansion to sixty-four S-ONUs 1822-1 through 1822-64 (in multiple premises) via sixty-four single fibers 1820-1 through 1820-64, it being understood that a different ratio splitter could be used in other embodiments and/or that not all of the 64 (or other number of) outlet ports are necessarily connected to an S-ONU.

Figure 9:
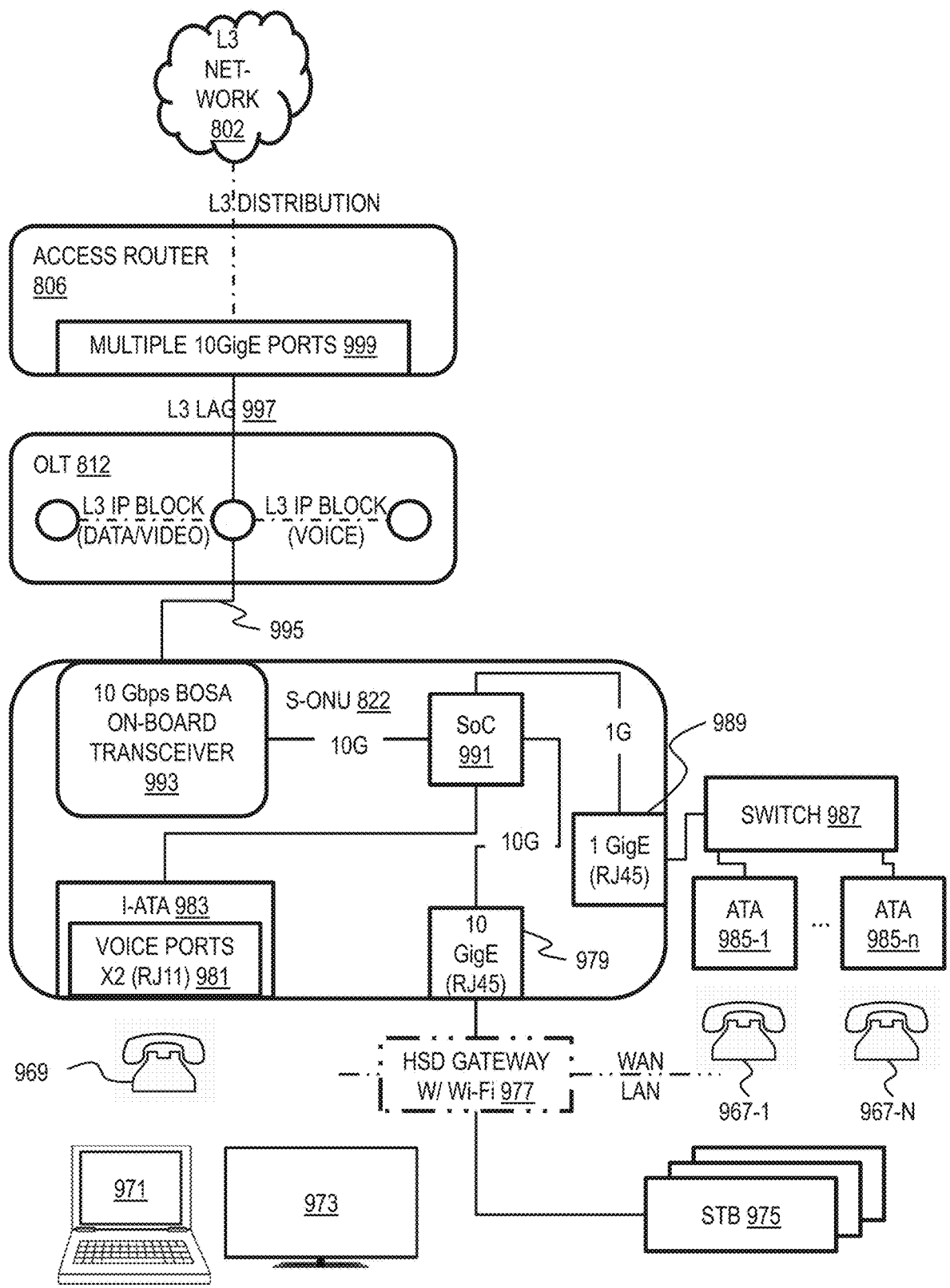
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 1806 is provided with multiple ten- Gigabit Ethernet ports 1999 and is coupled to OLT 1812 via L3 (layer 3) link aggregation group (LAG) 1997. OLT 1812 can include an L3 IP block for data and video, and another L3 IP block for voice, for example. In a non-limiting example, S-ONU 1822 includes a 10 Gbps bi-directional optical subassembly (BOSA) on-board transceiver 1993 with a 10G connection to system-on-chip (SoC) 1991. SoC 1991 is coupled to a 10 Gigabit Ethernet RJ45 port 1979, to which a high-speed data gateway 1977 with Wi-Fi capability is connected via category 5E cable. Gateway 1977 is coupled to one or more set-top boxes 1975 via category 5e, and effectively serves as a wide area network (WAN) to local area network (LAN) gateway. Wireless and/or wired connections can be provided to devices such as laptops 1971, televisions 1973, and the like, in a known manner. Appropriate telephonic capability can be provided. In a non-limiting example, residential customers are provided with an internal integrated voice gateway (I-ATA or internal analog telephone adapter) 1983 coupled to SoC 1991, with two RJ11 voice ports 1981 to which up to two analog telephones 1969 can be connected. Furthermore, in a non-limiting example, business customers are further provided with a 1 Gigabit Ethernet RJ45 port 1989 coupled to SoC 1991, to which switch 1987 is coupled via Category 5e cable. Switch 1987 provides connectivity for a desired number n (typically more than two) of analog telephones 1967-1 through 1967-n, suitable for the needs of the business, via external analog telephone adapters (ATAs) 1985-1 through 1985-n. The parameter "n" in FIG. 9 is not necessarily the same as the parameter "n" in other figures, but rather generally represents a desired number of units. Connection 1995 can be, for example, via SMF (single-mode optical fiber).

In addition to "broadcast" content (e.g., video programming), the systems of FIGS. 1-6, 8, and 9 can, if desired, also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Principles of the present disclosure will be described herein in the context of apparatus, systems, and methods for preventing, detecting and mitigating network attacks and anomalies. It is to be appreciated, however, that the specific apparatus and/or methods illustratively shown and described herein are to be considered exemplary as opposed to limiting. Moreover, it will become apparent to those skilled in the art given the teachings herein that numerous modifications can be made to the embodiments shown that are within the scope of the appended claims. That is, no limitations with respect to the embodiments shown and described herein are intended or should be inferred.

In one or more embodiments, a modified version of Resource Public Key Infrastructure (RPKI) validation is defined and utilized to validate flow specification rules (referred to as flowspec rules herein) that are advertised via, for example, extended BGP (eBGP). The validation essentially enables an entity receiving the flowspec rule to validate the originator of the flowspec rule. IETF Specification RFC 8360, Dissemination of Flow Specification Rules, by G. Huston et al., April 2018, is expressly incorporated by reference herein, in its entirety, for all purposes, and in any event is familiar to the skilled artisan, and is referred to herein as "RFC 8360."

One or more embodiments enable, for example, the mitigation of DDoS attacks destined for a particular device(s). To mitigate the attack, in one or more instances, the system automatically generates a flowspec rule to, for example, block traffic to the IP address to which the attack traffic is destined. Conventionally, routers would block the attack traffic at the peering edge of the entity (such as the peering edge of the legitimate autonomous system of the destination IP address) and thereby prevent the traffic from traversing the AS corresponding to the particular ASN. In one example embodiment, additional autonomous systems of other entities, such as those of other ISPs and the like, also implement the specified flowspec rule (or a version of the flowspec rule) and therefore block the attack traffic before it reaches the peering edge of the entity under attack.

In general, flowspec is an extension to BGP which allows firewall rules to be distributed via BGP advertisements. Normally, these rules are used to block malicious traffic, such as network traffic associated with a DDoS attack, within the Autonomous System (AS) that is under attack. Flowspec rules, however, are not conventionally advertised and implemented outside of an Autonomous System (AS) advertising the flowspec rule because other Autonomous Systems cannot trust the validity of flowspec rules received from outside their AS.

Traffic Filtering

IETF Specification RFC 5575, Dissemination of Flow Specification Rules, by P. Marques et al., August 2009, is expressly incorporated by reference herein, in its entirety, for all purposes, and in any event is familiar to the skilled artisan, and is referred to herein as "RFC 5575." Referring to Section 5 of RFC 5575, "Traffic Filtering," traffic filtering policies have been traditionally considered to be relatively static. Several techniques are currently used to control traffic filtering of DoS attacks, such as injecting unicast route advertisements corresponding to a destination prefix being attacked, or marking such route advertisements with a community that gets translated into a discard Next-Hop by the receiving router. Other variants are set forth in RFC 5575. Using unicast routing advertisements has the advantage of using the existing infrastructure and inter-AS communication channels, allowing, for instance, a service provider to accept filtering requests from customers for address space the customers own.

BGP

The Border Gateway Protocol Network Layer Reachability Information (BGP NLRI) encoding format is defined in RFC 5575 and is used to distribute traffic flow specifications, such as flow specification rules, allowing the routing system to propagate information regarding more specific components of the traffic aggregate defined by an IP destination prefix.

Additionally, two applications of the encoding format are defined, as set forth in the Abstract of RFC 5575.

Referring to Section 1 of RFC 5575, "Introduction," Modern IP routers contain the capability to perform various actions, such as to forward traffic according to IP prefixes as well as to classify, shape, rate limit, filter, or redirect packets based on administratively defined policies. These traffic policy mechanisms allow the router to define match rules that operate on multiple fields of the packet header. The actions performed by modern IP routers, such as the ones described above, can be associated with each rule. A flow specification received from an external autonomous system will typically need to be validated against unicast routing before being accepted. If the aggregate traffic flow defined by the unicast destination prefix is forwarded to a given BGP peer, then the local system can safely install more specific flow rules that may result in different forwarding behavior, as requested by the system.

Flow Specifications

Referring to Section 3 of RFC 5575, "Flow Specifications," a flow specification is an n-tuple including several matching criteria that can be applied to IP traffic. A given IP packet is said to match the defined flow if it matches all the specified criteria. A given flow may be associated with a set of attributes, depending on the particular application; such attributes may or may not include reachability information (i.e., NEXT_HOP). Well-known or AS-specific community attributes can be used to encode a set of predetermined actions. IETF Specification RFC 4760, Multiprotocol Extensions for BGP-4, by T. Bates et al., January 2007, is expressly incorporated by reference herein, in its entirety, for all purposes, and in any event is familiar to the skilled artisan, and is referred to herein as "RFC 4760." A particular application is identified by a specific (Address Family Identifier, Subsequent Address Family Identifier (AFI, SAFI)) pair (refer to Internet Engineering Task Force RFC4760); and corresponds to a distinct set of RIBs (Routing Information Base). Those RIBs should be treated independently from each other in order to assure non-interference between distinct applications.

Dissemination of Information

Referring to Section 4 of RFC 5575, "Dissemination of Information," a "Flow Specification" NLRI type is defined that may include several components such as destination prefix, source prefix, protocol, ports, and the like.

Order of Traffic Filtering Rules

Referring to Section 5.1 of RFC 5575, "Order of Traffic Filtering Rules," with traffic filtering rules, more than one rule may match a particular traffic flow. Thus, it is appropriate to define the order at which rules are matched and applied to a particular traffic flow. This ordering function should be such that it should not depend on the arrival order of the flow specification's rules and should be constant in the network.

Validation Procedure

Referring to Section 6 of RFC 5575, "Validation Procedure," flow specifications received from a BGP peer and that are accepted in the respective Adj-RIB-In are used as input to the route selection process. IETF Specification RFC 4271, A Border Gateway Protocol 4 (BGP-4), by Y. Rekhter et al., January 2006, is expressly incorporated by reference herein, in its entirety, for all purposes, and in any event is familiar to the skilled artisan, and is referred to herein as "RFC 4271."

The first step of the BGP Route Selection procedure (Refer to Section 9.1.2 of RFC 4271) is to exclude from the selection procedure routes that are considered non-feasible. In the context of IP routing information, this step is used to validate that the NEXT_HOP attribute of a given route is resolvable. The concept can be extended, in the case of flow specification NLRI, to allow other validation procedures.

In one example embodiment, the RPKI validation mechanism is used in conjunction with the destination IP address or destination IP prefix advertised in the flowspec rules to validate the originator of the flowspec rule. This provides for a level of trust regarding the validity of the flowspec rules that are advertised across the network, including across the Internet.

In general, RPKI is a method to cryptographically validate that an Autonomous System on the Internet, such as an ISP or hosting company, is allowed to originate an IP prefix via BGP. The digital certificate defined in RPKI indicates that only the advertised entity is allowed to originate for a sub-net block, such as the IP prefix of 1.2.3.0/24. RPKI does not conventionally support validation of an individual IP address as validation typically corresponds to any IP address within the 1.2.3.0/24 prefix. In one example embodiment, to validate an advertised flowspec rule, a check on the prefix of the digital certificate need not be performed; rather, the IP address of the flowspec rule is analyzed to determine that the specified IP address is one of the IP addresses corresponding to the prefix that is validated via RPKI. If the specified IP address is one of the IP addresses corresponding to the prefix that is validated via RPKI, then the rule is accepted as valid; otherwise, the rule is rejected or further validation activities are performed on the flowspec rule.

In the normal process of performing RPKI validation on unicast advertisements from neighbors, the maxLength and prefix length are taken into account in order to determine if the prefix being advertised is within the range specified by the RPKI validation. In the normal process, RPKI validation is only done on unicast advertisements and not flowspec rules. In one or more embodiments, however, this process should be done to validate that the destination prefix in the flowspec rule is not too small. This is because the flowspec rule will normally have a single /32 or /128 IP address defined as the destination prefix. The check to validate that the ASN originating the rule is allowed to originate advertisements with that destination prefix should be accomplished like normal RPKI validation, which conventionally validates an IP prefix advertisement, but in this case validates the destination IP prefix in the flowspec rule to ensure that it falls within the range that is specified by the ROA. Thus, RPKI validation of flowspec rules advertised via eBGP allows ASNs to perform origin validation. One or more embodiments apply, for example, to eBGP rules advertised with a destination prefix. If there is no destination prefix, then there is nothing to perform RPKI validation on and the rule would normally be dropped.

Figure 10:
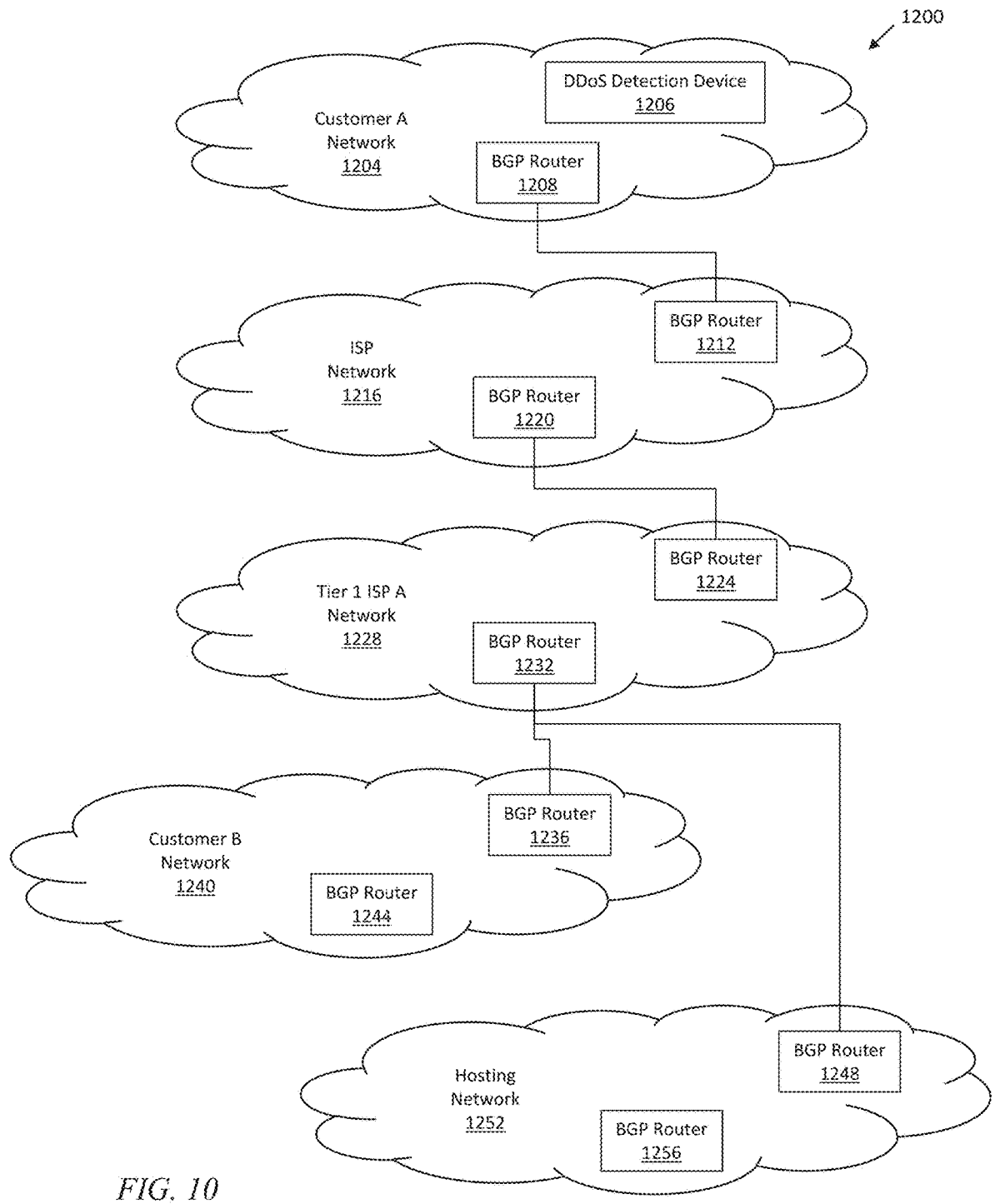
FIG. 10 is a high-level block diagram of an example BGP network, in accordance with an example embodiment.

FIG. 10 is a high-level block diagram 1200 of an example BGP network 1200, in accordance with an example embodiment. The BGP network 1200 includes a plurality of networks, such as a customer A network 1204 that includes a BGP router 1208 and a DDoS detection device 1206; an ISP network 1216 that includes a BGP router 1212 and a BGP router 1220; a tier 1 ISP A network 1228 that includes a BGP router 1224 and a BGP router 1232; a customer B network 1240 that includes a BGP router 1236 and a BGP router 1244; and a hosting network 1252 that includes a BGP router 1248 and a BGP router 1256. In the example embodiment of FIG. 10, the plurality of networks of the BGP network 1200 are connected via the BGP routers of FIG. 10 (such as BGP router 1208 and BGP router 1212, which interconnect the customer A network 1204 and the ISP network 1216). Each BGP router provides for, for example, the transmission of IP traffic across the BGP network 1200.

Consider a DDoS attack on the customer A network 1204 via the BGP router 1208; the attack originates from the hosting network 1252. Conventionally, a flowspec rule may be advertised via the BGP protocol within the customer A network 1204 to mitigate the attack. The internet service provider (ISP) network 1216 would also be able to participate in the mitigation effort as it has the ability to validate the flowspec rule since the customer A network 1204 is the only possible source of the flowspec rule. Furthermore in this regard, normally, ISPs only trust flowspec rules that come directly from a directly connected peer. Using one or more embodiments, any ISP can trust any flowspec rule that came from any other ISP, customer, etc. as long as the destination IP in the flowspec rule falls within the subnet range defined by the RPKI ROA.

Conventionally, the flowspec rule could not be utilized by other entities, such as the tier 1 ISP A network 1228, as the tier 1 ISP A network 1228 would not have a mechanism to validate the flowspec rule as originating from a source authorized to issue the flowspec rule. As described above and described below in conjunction with the flowchart of FIG. 11, the disclosed modified RPKI validation procedure may be used, for example, by the tier 1 ISP A network 1228 to cryptographically validate the flowspec rule, as described below by way of example in conjunction with FIG. 11.

Figure 11:
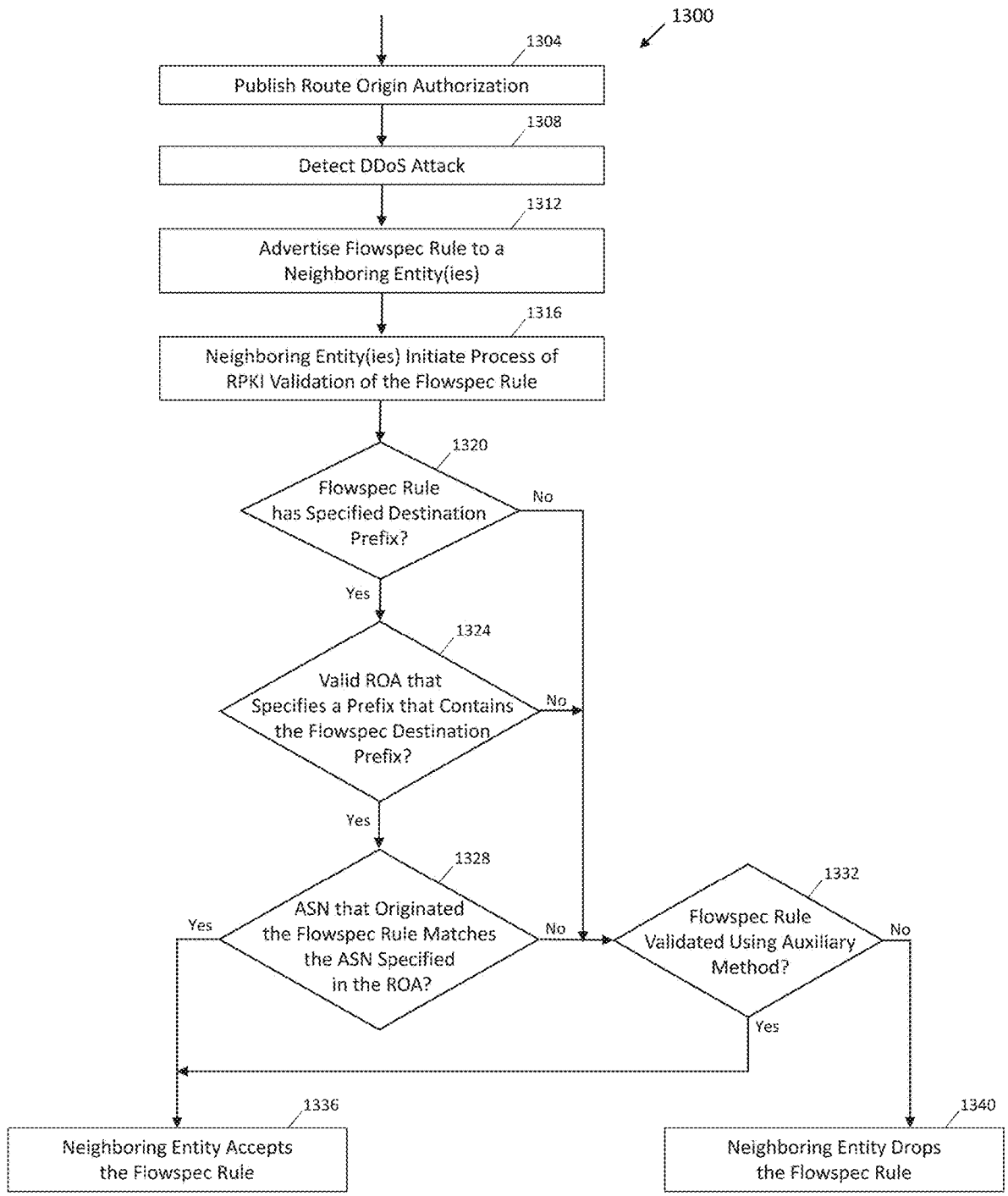
FIG. 11 is a flowchart for an example method for processing a flow specification rule, in accordance with an example embodiment.

FIG. 11 is a flowchart for an example method 1300 for processing a flowspec rule, in accordance with an example embodiment. A first entity, such as the customer A network 1204, publishes a valid route origin authorization (ROA) for a specified IP address, such as 192.0.0.0/24 (operation 1304). A DDoS attack to a given IP address, such as 192.0.0.1 in the customer A network 1204, is detected, for example, by a DDoS detection device 1206 of the first entity (operation 1308). The first entity advertises a flowspec rule to one or more neighboring entities, such as the ISP network 1216 and the tier 1 ISP A 1228, so that the neighboring entity(ies) can help reduce the amount of attack traffic to the first entity and thereby mitigate the attack (operation 1312). In one example embodiment, the advertisement is issued by the DDoS detection device 1206, the BGP router 1208, or another network-based device of the customer A network 1204.

The neighboring entity(ies) begins a process of a modified RPKI validation of the flowspec rule (operation 1316). For example, a BGP speaker, such as the BGP router 1224, a firewall, a network switch, a server, and the like, of a neighboring entity may initiate the modified RPKI validation of the flowspec rule.

A check is then performed by each entity that received the flowspec rule to determine if the flowspec rule has the specified destination prefix (decision block 1320). If the flowspec rule does not have the specified destination prefix (NO branch of decision block 1320), the method 1300 proceeds with decision block 1332.

If the flowspec rule has the specified destination prefix (YES branch of decision block 1320), a check is performed to determine if there is a valid ROA that specifies a prefix that contains the flowspec destination prefix (decision block 1324). If there is no valid ROA that specifies a prefix that contains the flowspec destination prefix (NO branch of decision block 1324), the method 1300 proceeds with decision block 1332.

If there is a valid ROA that specifies a prefix that contains the flowspec destination prefix (YES branch of decision block 1324), a check is performed to determine if the autonomous system that originated the flowspec rule matches the ASN specified in the ROA (decision block 1328). If the autonomous system that originated the flowspec rule does not match the ASN specified in the ROA (NO branch of decision block 1328), the method 1300 proceeds with decision block 1332. If the autonomous system that originated the flowspec rule matches the ASN specified in the ROA (YES branch of operation 1328), the neighboring entity accepts the flowspec rule and sends the flowspec rule to the appropriate routers to begin dropping the attack traffic sent to the given IP address; that is, for example, dropping attack traffic to IP address 192.0.0.1 in the customer A network 1204 (operation 1336).

During decision block 1332, a check is performed to determine if the flowspec rule is validated using an auxiliary validation method. If the flowspec rule is validated using the auxiliary method (YES branch of decision block 1332), the neighboring entity accepts the flowspec rule and sends the flowspec rule to the appropriate routers to begin dropping attack traffic to the given IP address (operation 1336). If the flowspec rule is not validated using the auxiliary method (NO branch of decision block 1332), the neighboring entity drops the flowspec rule (operation 1340). Generally, additional validity checks can be employed and/or the logical flow can be repeated as needed.

Recapitulation

Given the discussion thus far, it will be appreciated that, in general terms, an exemplary method, according to an aspect of the invention, includes the operations of publishing a valid route origin authorization (ROA) for a specified IP address (operation 1304); detecting a distributed denial-of-service (DDoS) attack to a given IP address (operation 1308); advertising a flowspec rule from a given autonomous system network to one or more neighboring autonomous system networks in response to the detection of the distributed denial-of-service (DDoS) attack (operation 1312); performing a modified Resource Public Key Infrastructure (RPKI) validation using the published valid route origin authorization (ROA) in response to the advertisement of the flowspec rule (operation 1316); and implementing the flowspec rule to mitigate the distributed denial-of-service (DDoS) attack in response to the validation of the flowspec rule (operation 1336).

In one example embodiment, a first entity (customer A network 1204) performs the publication of the valid route origin authorization, the detection of the distributed denial-of-service (DDoS) attack, and the advertisement of the flowspec rule to the one or more neighboring entities (the ISP network 1216 and the tier 1 ISP A 1228). In one example embodiment, the one or more neighboring entities (the ISP network 1216 and the tier 1 ISP A 1228) perform the modified Resource Public Key Infrastructure (RPKI) validation. In one example embodiment, the modified Resource Public Key Infrastructure (RPKI) validation is initiated by a BGP speaker (BGP router 1224). In one example embodiment, the performance of the Resource Public Key Infrastructure (RPKI) validation further includes determining if the flowspec rule has a specified destination prefix (decision block 1320). In one example embodiment, the performance of the modified Resource Public Key Infrastructure (RPKI) validation further includes determining whether the valid route origin authorization (ROA) specifies a prefix that contains a destination prefix of the flowspec rule (decision block 1324).

In one example embodiment, the performance of the modified Resource Public Key Infrastructure (RPKI) validation further includes determining if an autonomous system that originated the flowspec rule matches an autonomous system number (ASN) specified in the route origin authorization (ROA) (decision block 1328). In one example embodiment, the implementation of the flowspec rule further includes sending the flowspec rule to one or more routers (BGP router 1232). In one example embodiment, the flowspec rule is dropped in response to an invalidation of the flowspec rule (operation 1340). In one example embodiment, the flowspec rule is validated using an auxiliary validation method (operation 1332).

In one example embodiment, a non-transitory computer readable medium includes computer executable instructions which when executed by a computer cause the computer to perform the method of: performing a modified Resource Public Key Infrastructure (RPKI) validation using the published valid route origin authorization (ROA) in response to the advertisement of the flowspec rule (operation 1316); and implementing the flowspec rule to mitigate the distributed denial-of-service (DDoS) attack in response to the validation of the flowspec rule (operation 1336).

In one example embodiment, a networked computing system includes first and second networks. The first network includes a first network-based device implemented using a first memory and at least one first processor, coupled to the first memory, and operative to perform operations including: publishing a valid route origin authorization (ROA) for a specified IP address (operation 1304); detecting a distributed denial-of-service (DDoS) attack to a given IP address (operation 1308); and advertising a flowspec rule from a given autonomous system network to one or more neighboring autonomous system networks in response to the detection of the distributed denial-of-service (DDoS) attack (operation 1312). The second network includes a second network-based device implemented using a second memory and at least one second processor, coupled to the second memory, and operative to perform operations including: performing a modified Resource Public Key Infrastructure (RPKI) validation using the published valid route origin authorization (ROA) in response to the advertisement of the flowspec rule (operation 1316); and implementing the flowspec rule to mitigate the distributed denial-of-service (DDoS) attack in response to the validation of the flowspec rule (operation 1336).

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). Appropriate interconnections via bus, network, and the like can also be included.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system, to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass transmission media per se or disembodied signals per se. Appropriate interconnections via bus, network, and the like can also be included.

Figure 7:
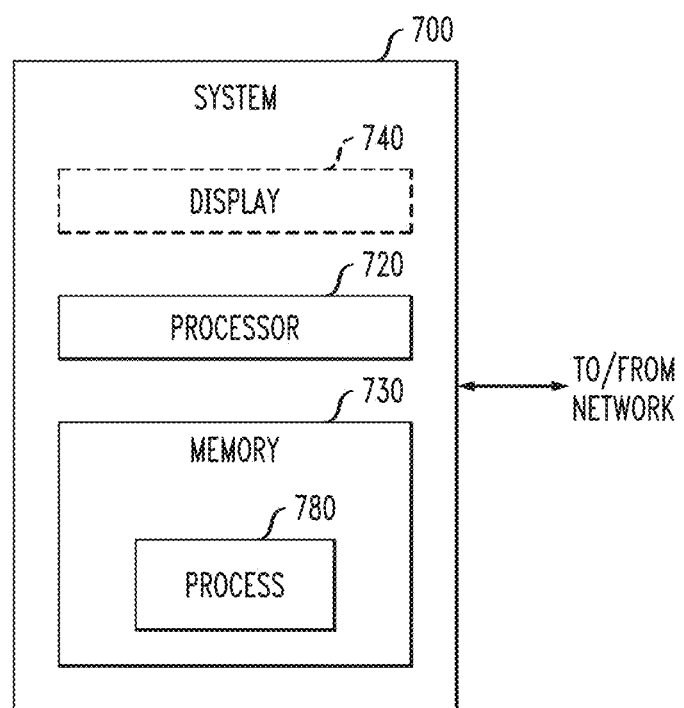
FIG. 7 is a block diagram of a computer system useful in connection with one or more aspects of the invention.

FIG. 7 is a block diagram of at least a portion of an exemplary system 700 that can be configured to implement at least some aspects of the invention, and is representative, for example, of one or more of the apparatus or modules shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors, either concurrently (i.e., in parallel) or sequentially (i.e., in series).

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., keyboards, mice, and the like). Every processor may not have a display, keyboard, mouse or the like associated with it.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program comprising computer program code means adapted to perform one or all of the steps of any methods or claims set forth herein when such program is run, and that such program may be embodied on a tangible computer readable recordable storage medium. As used herein, including the claims, unless it is unambiguously apparent from the context that only server software is being referred to, a "server" includes a physical data processing system running a server program. It will be understood that such a physical server may or may not include a display, keyboard, or other input/output components. Furthermore, as used herein, including the claims, a "router" includes a networking device with both software and hardware tailored to the tasks of routing and forwarding information. Note that servers and routers can be virtualized instead of being physical devices (although there is still underlying hardware in the case of virtualization).

Furthermore, it should be noted that any of the methods described herein can include an additional step of providing a system comprising distinct software modules or components embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors. Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   publishing a valid route origin authorization (ROA) for a specified IP address;
   detecting a distributed denial-of-service (DDoS) attack to a given IP address;
   advertising a flowspec rule from a given autonomous system network to one or more neighboring autonomous system networks in response to the detection of the distributed denial-of-service (DDoS) attack;
   performing a modified Resource Public Key Infrastructure (RPKI) validation using the published valid route origin authorization (ROA) in response to the advertising of the flowspec rule, the advertising performed in response to the detection of the distributed denial-of-service (DDoS) attack; and
   implementing the flowspec rule to mitigate the distributed denial-of-service (DDoS) attack in response to a validation of the flowspec rule based on the performing the modified Resource Public Key Infrastructure (RPKI) validation.

2. The method of claim 1, wherein a first entity performs the publication of the valid route origin authorization, the detection of the distributed denial-of-service (DDoS) attack, and the advertisement of the flowspec rule to the one or more neighboring entities.

3. The method of claim 1, wherein the one or more neighboring entities perform the modified Resource Public Key Infrastructure (RPKI) validation.

4. The method of claim 1, wherein the modified Resource Public Key Infrastructure (RPKI) validation is initiated by a BGP speaker.

5. The method of claim 1, wherein the performance of the modified Resource Public Key Infrastructure (RPKI) validation further comprises determining if the flowspec rule has a specified destination prefix.

6. The method of claim 1, wherein the performing of the modified Resource Public Key Infrastructure (RPKI) validation validates an originator of the flowspec rule and further comprises validating that a destination prefix of the flowspec rule falls within a range specified by the route origin authorization (ROA).

7. The method of claim 1, wherein the performing of the modified Resource Public Key Infrastructure (RPKI) validation further comprises determining if an autonomous system that originated the flowspec rule matches an autonomous system number (ASN) specified in the route origin authorization (ROA).

8. The method of claim 1, wherein the implementation of the flowspec rule further comprises sending the flowspec rule to one or more routers.

9. The method of claim 1, further comprising dropping the flowspec rule in response to an invalidation of the flowspec rule.

10. The method of claim 1, further comprising validating the flowspec rule using an auxiliary validation method.

11. A non-transitory computer readable medium comprising computer executable instructions which when executed by a computer cause the computer to perform the method of:
    performing a modified Resource Public Key Infrastructure (RPKI) validation using a published valid route origin authorization (ROA) in response to an advertising of a flowspec rule; and
    implementing the flowspec rule to mitigate the distributed denial-of-service (DDoS) attack in response to a validation of the flowspec rule based on the performing the modified Resource Public Key Infrastructure (RPKI) validation, the advertising performed in response to the detection of the distributed denial-of-service (DDoS) attack.

12. A networked computing system, the networked computing system comprising:
    a first network comprising a first network-based device implemented using a first memory and at least one first processor, coupled to the first memory, and operative to perform operations comprising:
      publishing a valid route origin authorization (ROA) for a specified IP address;
      detecting a distributed denial-of-service (DDoS) attack to a given IP address; and
      advertising a flowspec rule from a given autonomous system network to one or more neighboring autonomous system networks in response to the detection of the distributed denial-of-service (DDoS) attack; and a second network comprising a second network-based device implemented using a second memory and at least one second processor, coupled to the second memory, and operative to perform operations comprising:

performing a modified Resource Public Key Infrastructure (RPKI) validation using the published valid route origin authorization (ROA) in response to the advertising of the flowspec rule, the advertising performed advertised in response to the detection of the distributed denial-of-service (DDoS) attack; and implementing the flowspec rule to mitigate the distributed denial-of-service (DDoS) attack in response to a validation of the flowspec rule based on the performing the modified Resource Public Key Infrastructure (RPKI) validation.

13. The networked computing system of claim 12, wherein the first network performs the publication of the valid route origin authorization, the detection of the distributed denial-of-service (DDoS) attack, and the advertisement of the flowspec rule to the one or more neighboring entities.

14. The networked computing system of claim 12, wherein the one or more neighboring entities perform the modified Resource Public Key Infrastructure (RPKI) validation.

15. The networked computing system of claim 12, wherein the modified Resource Public Key Infrastructure (RPKI) validation is initiated by a BGP speaker.

16. The networked computing system of claim 12, wherein the performing of the modified Resource Public Key Infrastructure (RPKI) validation validates an originator of the flowspec rule and further comprises validating that a destination prefix of the flowspec rule falls within a range specified by the route origin authorization (ROA).

17. The networked computing system of claim 12, wherein the performing of the modified Resource Public Key Infrastructure (RPKI) validation further comprises determining whether the valid route origin authorization (ROA) specifies a prefix that contains a destination prefix of the flowspec rule.

18. The networked computing system of claim 12, wherein the performing of the modified Resource Public Key Infrastructure (RPKI) validation further comprises determining if an autonomous system that originated the flowspec rule matches an autonomous system number (ASN) specified in the route origin authorization (ROA).

19. The networked computing system of claim 12, wherein the implementation of the flowspec rule further comprises sending the flowspec rule to one or more routers.

20. The networked computing system of claim 12, wherein the second network-based device is further operative to drop the flowspec rule in response to an invalidation of the flowspec rule.

* * * * *